June 9, 1925.  
H. S. POWELL  
1,541,277  
JOINT FOR THE SPRINGS OF MOTOR VEHICLES  
Filed Dec. 15, 1924

INVENTOR  
Herbert S. Powell  
BY Thomas L. Wilder  
ATTORNEY

Patented June 9, 1925.

1,541,277

UNITED STATES PATENT OFFICE.

HERBERT S. POWELL, OF NEW HARTFORD, NEW YORK.

JOINT FOR THE SPRINGS OF MOTOR VEHICLES.

Application filed December 15, 1924. Serial No. 756,009.

*To all whom it may concern:*

Be it known that I, HERBERT S. POWELL, a citizen of the United States, residing at New Hartford, in the county of Oneida and State of New York, have invented certain new and useful Improvements in Joints for the Springs of Motor Vehicles, of which the following is a specification, reference being had therein to the accompanying drawing.

My invention relates to joint for the springs of motor vehicles, and I declare the following to be a full, clear, concise and exact description thereof sufficient to enable anyone skilled in the art to which it appertains to make and use the same reference being had to the accompanying drawings in which like reference characters refer to like parts throughout the specification.

The object of the invention is to provide an oilless joint that can be attached in a removable manner to the spring ends and shackles of motor vehicles or other conveyances, whereby to eliminate the use of oil at the joint and to improve the riding qualities of the vehicle as well as to prolong the life of the spring.

The joint is made to be inserted within the bent over or rolled up ends and within the shackles of any leaf spring.

The object will be understood by referring to the drawings in which.

Figure 1:
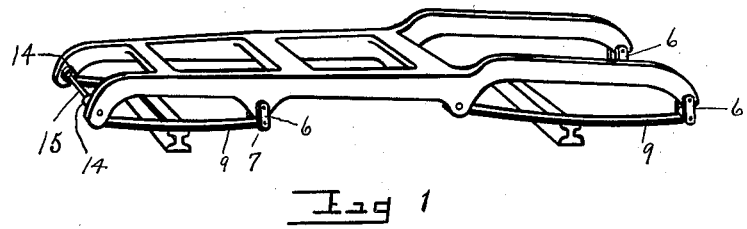
Figure 1 is a perspective view of the chassis of a motor vehicle showing the novel joint applied thereto.
Figure 2:
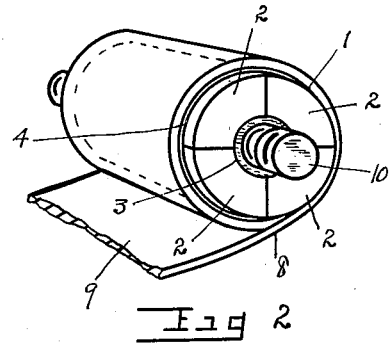
Figure 2 is a detail enlarged view of the end of a spring showing the joint assembled thereto, parts of the spring being broken away.

Referring more particularly to the drawings, the device embodies a cylindrical rubber bushing 1 that is made up of four equal parts 2 that are adapted to fit together and that in cross section are in the form of quadrants. The inner or center portions being cut away on the arc of a circle to form a central recess adapted for the disposition of a metallic sleeve 3 about which parts 2 are assembled.

The parts thus mounted on sleeve 3 are forced through a metallic shell 4 of lesser interior diameter by a process described in an application filed by me December 8, 1922, and numbered serially 605,717, hereby to compress said parts 2 between the outer surface of sleeve 3 and the interior surface of shell 4. It will be noted that sleeve 3 is shorter longitudinally than rubber bushing 1, whereby the ends of rubber bushing 1 will project beyond the edges of shell 4, on either side, thereof. These projecting portions of parts 2 of rubber bushing 1 will make a close fitting contact with the adjacent surfaces of hangers 6, 6 of shakle 7, when the parts are assembled, and, in this manner hold rubber bushing 1 firmly against hangers 6, 6 to prevent rubber parts 2 from moving relative to each other and to hangers 6, 6.

With parts 2 of rubber bushing 1 inserted within shell 4 and about the central sleeve 3, the whole is inserted much, in the same manner that a cartridge is inserted in a gun in the rolled up end 8 of leaf spring 9. A bolt 10 is projected then through the central recess of sleeve 3, which bolt is adapted to have bearings in alined apertures made in hangers 6, 6. Nuts 11, 11 are mounted to the threaded ends of bolt 10 outside of hangers 6, 6 whereby to draw and hold the joint in place in the rolled up end 8 of leaf spring 9 and to force the lateral or end surfaces of parts 2 of rubber bushing 1 tightly against the contiguous surfaces of hangers 6, 6. This will hold rubber bushing 1 from moving relative to hangers 6, 6.

Moreover, the cartridge joint can be disposed in the end of a spring, as at 14 and a rod as 15 slipped through the central aperture of sleeve 3, in place of the shackle construction hereinabove described.

Figure 3:
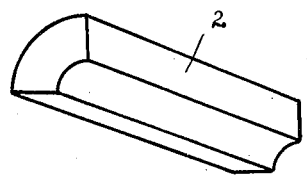
Figure 3 is a detail enlarged view showing a perspective of a rubber member employed in the joint.
Figure 5:
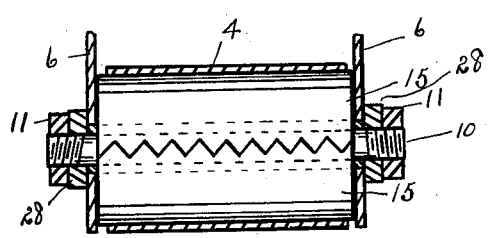
Figure 5 is an enlarged view showing an elevation of the modified form of members illustrated in Figures 3 and 4 in assembled position, parts of the joint being shown in section.
Figure 4:
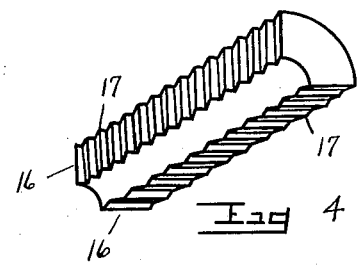
Figure 4 is a detail enlarged view, showing a perspective of a modified form of the member illustrated in Figure 3.

Fig. 3 shows a modified manner of constructing the rubber bushing 1. Here the rubber parts 15, there being four in number, for each bushing, are equipped, in each instance, along the contracting faces 16, 16 thereof with complementary or intermeshing teeth 17 adapted for fitting the parts together in such manner as to prevent any longitudinal movement relative to each other.

By the use of rubber parts 2 of the former and 15 of the latter or modified construction to form bushings 1, there will be effected economy in repairing said bushings. It being necessary to replace only the worn out parts when repairing the joint. The good parts being salvaged for future use.

Figure 6:
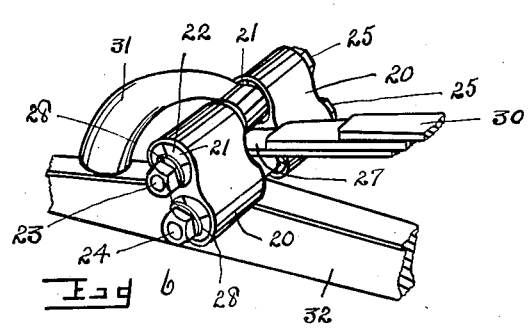
Figure 6 is a detail perspective view showing a still further modified form of the joint.
Figure 7:
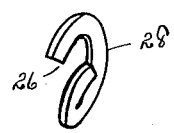
Figure 7 is a detail enlarged perspective view of a spring lock washer employed.

The modified joint shown in Figs. 6 and 7 is used more particularly for connecting the end of a laminated leaf spring such as employed on a Ford automobile. Here a casing 20 in pairs is made with two chambers for the disposition of the rubber bushings 21, 21 through the center of which rubber bushings is projected the sleeves 22, 22 forming bearings for shafts 23, 24. The ends of each of the shafts 23, 24, are screw threaded for the mounting of nuts 25. Spring washers 28 split transversely at 26 are employed to lock nuts 25 in given tightened position.

The end 27 of laminated leaf spring 30 is coiled about lower shaft 24 between casings 20. Upper shaft 23 projects through an aperture formed in bracket 31 of the frame 32 of an automobile.

Having thus described my invention what I claim as new and desire to secure by Letters Patent is:

1. In a joint for the springs of motor vehicles, a shell containing removable flexible members adapted to fit together, a sleeve passing through said flexible members, and means permitting said shell to be removably mounted to the spring thereon in shackles of motor vehicles.

2. In a joint for the springs of motor vehicles, a shell containing removable rubber members compressed therein and adapted to fit together, a sleeve passing through the center of said members, and means permitting said shell to be removably mounted to the spring ends in shackles of motor vehicles.

3. In a joint for the springs of motor vehicles, a shell containing interfitting rubber members forming a bushing and compressed therein, a sleeve passing through the center of said bushing, and annular retaining members for holding said shell on said rubber bushing.

4. In a joint for the springs of motor vehicles, a shell, interfitting rubber members forming an annular bushing disposed within said shell, a sleeve passing through the center of said bushing, and means permitting said shell to be removably mounted to the spring ends of shackles of motor vehicles.

5. In a joint for the springs of motor vehicles, a shell, interfitting rubber members forming an annular bushing disposed within said shell, means on said members to aid in holding the same against relative longitudinal movements and means permitting said shell to be removably mounted to the spring ends in shackles of motor vehicles.

6. In a joint for the springs of motor vehicles having hangers, a shell, rubber members forming an annular bushing disposed within said shell, and intermeshing teeth on said rubber members to aid in holding the same against relative longitudinal movements.

7. In a joint for the springs of motor vehicles having hangers, a shell, rubber members forming an annular bushing disposed within said shell, means on said members to aid in holding the same against relative longitudinal movements and the lateral surface of said rubber bushing adapted to make contact with the surface of said hangers, whereby to hold said rubber bushing from moving relative to said hangers.

In testimony whereof I affix my signature.

HERBERT S. POWELL.